Figure 1:
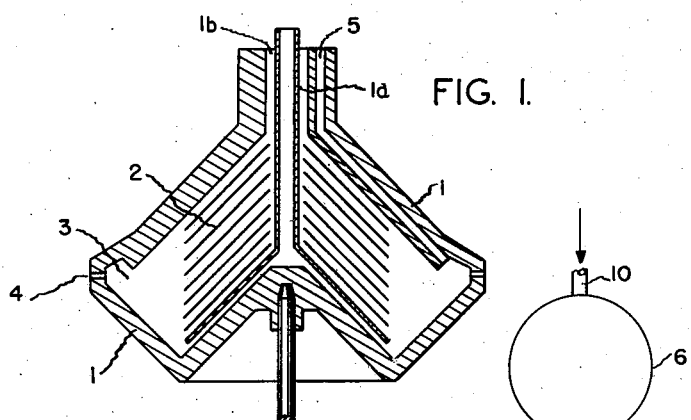

Aug. 16, 1949.  H. O. LINDGREN  2,478,971
PURIFYING SUGAR JUICE
Filed Oct. 30, 1946

Inventor
HANS OLOF LINDGREN
By
Attorney

Patented Aug. 16, 1949

2,478,971

UNITED STATES PATENT OFFICE 2,478,971

PURIFYING SUGAR JUICE

Hans Olof Lindgren, Smedslatten, Sweden, assignor to Aktiebolaget Separator, Stockholm, Sweden, a corporation of Sweden Application October 30, 1946, Serial No. 706,781
In Sweden November 16, 1945

6 Claims. (Cl. 127—53)

This invention relates to the production of sugar juices and has particular reference to an improved process for purifying such juices.

Cane sugar is generally obtained by pressing the sugar-cane between rollers, while beet sugar is obtained by diffusion. The sugar solutions produced by these methods normally contain about 10–20% sugar, together with substances in colloidal or real solution, such as organic acids, coloring matter, proteins, sugar-cane juices, waxes and rubber substances.

The purification of the sugar juices is effected by the addition of lime at high temperature and in many cases by introducing carbonic acid and sulphurous acid. As known in the art, the purpose of these treatments is to neutralize the sugar juice and particularly to remove the proteins as much as possible. At the subsequent evaporating of the juices, difficulties are encountered due to the proteins, which also lower the quality of the sugar.

In spite of these treatments, proteins and other impurities remain in the juice, and the greater part of them is precipitated when the juice is thickened by evaporation in the evaporator. If these proteins and other impurities are removed from the concentrated juice (the "thick juice"), then crystal formation is facilitated and a purer sugar obtained. These impurities can be removed by filters, which produce a very pure juice. Filters, however, are used only on a limited scale, since the slimy substances in the juice very quickly form a layer on the filter-cloth which cannot be penetrated by the juice.

When purifying the juice by means of centrifugal separators, these difficulties are not met. Therefore, a number of plants have been erected, in which centrifuges are used for purifying the thick juice. While the sugar juice purified in these plants has not been found to be as clean as filtered juice, the centrifugal purifying has given a much higher yield, and the quality of the sugar has been found higher than sugar produced from juice which has not been purified.

The concentration of sugar juice by evaporation is carried out in two types of apparatus, first in evaporators and then in crystallizers. In the first-mentioned apparatus, the juice is generally thickened by evaporation to a concentration corresponding to 60 Brix. In the evaporators, substances dissolved in the juice are precipitated, largely during the early period of the evaporation. It has been found that after the juice has been thickened to a concentration corresponding to about 50 Brix, very little impurities are precipitated by further evaporation. At this concentration, the viscosity of the juice is considerably lower than at 60 Brix.

The present invention has for its object to improve the process of centrifugally purifying sugar juice which has been thickened by evaporation, so as to make the process more economical. The invention is characterized principally by the fact that the juice is purified during the evaporating process in the evaporators.

According to the invention, the sugar juice is withdrawn from the evaporating plant at a suitable point, for instance, at a point where the concentration amounts to about 50 Brix. The juice is then purified by centrifuging in centrifugal separators, and after the juice has been thus purified it is returned to the evaporators to be further concentrated. Since the juice is centrifuged at a lower concentration, and therefore at a lower specific gravity and a lower viscosity, each separator can purify a considerably greater quantity than would be possible if it were used for purifying juice which has been finally concentrated. Although some impurities are precipitated at the subsequent evaporation to about 60 Brix, the quantity of these precipitated substances has been found to be considerably smaller than that remaining in juice which is centrifuged only after the final concentration, because the difference in specific gravity between the juice and the impurities is very small after the final concentration.

According to one form of the new process, the juice withdrawn from the evaporating system in the manner described above, is heated to a temperature high enough to coagulate and precipitate the proteins present in the juice in colloidal solution. This occurs when the juice is near the boiling point, i. e. about 100° C. By thus heating the juice, its viscosity is reduced to a substantial extent, and the separator can operate at a still higher throughout rate. Thus, I have found it possible to attain the same degree of purity of the juice at a throughput rate about 2½ to 3 times as great as with juice concentrated to 60 Brix and separated at the evaporation temperature.

In the practice of the process according to one form of the invention, the concentrated juice is treated with lime and carbon dioxide before the centrifuging. This treatment is preferably performed after the juice has been heated to a temperature advantageous for the centrifuging. The lime crystals formed at the reaction have a purifying effect, partly by absorption and partly by facilitating the centrifugal separation, because the crystals form (together with the organic impurities) aggregates having a high specific gravity. Consequently, the throughput rate of the separator can be further increased, with the same degree of purity of the separated juice.

For centrifuging juice which has not been treated in the last-mentioned manner, separators can be used in which the separated sludge deposits on the inner sides of the bowls. In such cases, when a certain quantity of juice has been centrifuged, so much sludge will have deposited in the bowl that the separating operation must be interrupted and the bowl cleaned.

Juice treated with lime has a much higher content of impurities and fills the separator bowl with sludge in so short a period of time that the bowl-cleaning work becomes too expensive and the purifying method becomes uneconomical. For such juice, separators are used from which the sludge is continuously discharged.

Figure 2:
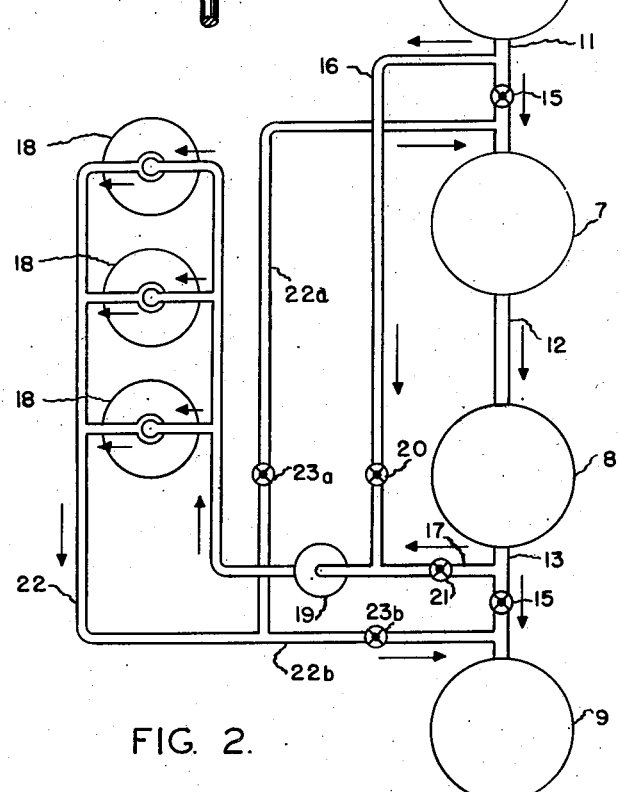

For a more complete understanding of the invention, reference may be had to the accompanying drawing, in which Fig. 1 is a sectional view of a separator bowl adapted to discharge the sludge continuously, and Fig. 2 is a schematic view of a plant for use in practicing the invention.

Referring to Fig. 1, the bowl comprises a shell 1 having a central part 1a through which the juice is fed into the bowl and distributed in thin layers between a number of conical discs 2. The particles suspended in the juice are, under the influence of the centrifugal force, conveyed toward the lower sides of these discs and slide along them out into the peripheral chamber 3. The latter is formed by two generally conical parts of the bowl shell, and at the region where these conical parts meet, the bowl is provided with a number of openings 4 (nozzles) through which a mixture of sugar juice and particles is discharged. The purified sugar juice, being of lower specific gravity than the particles, flows inwardly between the discs 2 along their upper sides and is discharged from the top of the bowl through a central outlet 1b in the neck surrounding the central part 1a.

It is not difficult to de-sugar the sludge discharged from the outlets 4, by diluting it with water and separating the solution, which procedure can be repeated. However, it is desirable to keep the sugar content in the sludge concentrate as low as possible, i. e. the content of sludge should be as high as possible. By using very small openings 4 in the bowl wall, the sugar juice content of the sludge discharge can be reduced, although in a rather small degree, as a certain minimum size of these openings must be used in order to ensure a reliable operation of the machine.

According to one modification, part of the sludge discharge from the outlets 4 is returned to the separator bowl, preferably in the manner shown in Fig. 1. The mixture is fed to the separator bowl through channels 5 which terminate in the peripheral portion of the bowl near the openings 4. By this procedure, a high sludge concentration is attained, and the sludge is not mixed with the juice to be separated, which is an important feature.

In cane-sugar plants, it may be advantageous to convey the sludge concentrate back to a previous stage in the process, for instance, to the rolling apparatus used for crushing the cane, and the sludge can also be mixed with the water used for desugaring the cane-mass. In beet-sugar plants, it is preferable to mix the sludge concentrate with the water of diffusion.

Referring to Fig. 2, the plant there shown includes evaporators 6, 7, 8 and 9 comprising an evaporating stage for thickening sugar juice, with 10-20% sugar, to a sugar content of 50-60%, the juice being fed through a pipe 10 to the first evaporator 6. The evaporator 6 is connected by a pipe 11 to the evaporator 7, which communicates with the evaporator 8 through a pipe 12. The juice from the evaporator 8 is conveyed to the last evaporator 9 through a pipe 13, the juice finally concentrated being discharged through a pipe 14. In the pipes 11 and 13 are flow regulating devices or valves 15.

To the pipes 11 and 13 are connected pipes 16 and 17, respectively, through which juice can be withdrawn from the evaporating system and conveyed to the centrifugal separators 18 by means of a pump 19, or the like. By proper regulation of valves 20 and 21 in the separator supply pipes 16 and 17, respectively, the juice can be fed to the centrifugal separators either from the pipe 11 or from the pipe 13, or from both.

The juice is conveyed to the separators 18 in the manner indicated by the arrows in Fig. 2. The separators are preferably provided with tight or sealed inlets and outlets to prevent air from being mixed with the juice, which would cause an oxidation of it. The purified juice from the separators is preferably collected in a pipe 22 and returned through branch pipes 22a and 22b to the pipes 11 and 13, respectively, of the evaporating apparatus. If desired, the return pipes 22a and 22b may be provided with valves 23a and 23b, respectively, whereby the purified juice may be returned to the evaporating apparatus at either or both of the pipes 11 and 13.

I claim:

1. In a process for purifying sugar juice and including the step of thickening the juice in an evaporating stage, the improvement which comprises withdrawing the juice from the evaporating stage at a point where the juice has a concentration in the order of 50 Brix, feeding the partially evaporated juice thus withdrawn to a locus of centrifugal force to remove impurities from the juice, and then returning the purified juice from said locus to the evaporation stage for further concentrating.

2. The improvement as defined in claim 1, in which the juice is withdrawn from the evaporating stage at a point where the sugar content of the juice is lower than 60 percent.

3. The improvement as defined in claim 1, which comprises also the step of heating said partially evaporated juice to a temperature in the order of 100° C., before the juice is fed to the locus of centrifugal force.

4. The improvement as defined in claim 1, which comprises also the step of adding lime and carbon dioxide to said partially evaporated juice before it is fed to the locus of centrifugal force.

5. In the process for purifying sugar juice and including the step of thickening the juice in an evaporating stage, the improvement which comprises interrupting the evaporation by withdrawing incompletely evaporated juice from said stage at a point where the juice has acquired a concentration in the order of 50 Brix, heating the incompletely evaporated juice thus withdrawn to a temperature in the order of 100° C., feeding the withdrawn and heated juice to a locus of centrifugal force and there removing impurities from the juice by centrifugal action, and then returning the purified juice from said locus to the evaporation stage and completing the evaporation in said stage.

6. In a process for purifying sugar juice and including the step of thickening the juice in an evaporating apparatus, prior to crystallization of the sugar, the improvement which comprises temporarily withdrawing the juice from the evaporating apparatus at a point where the juice has a concentration in the order of 50 Brix, feeding the partially concentrated juice thus withdrawn to a locus of centrifugal force at a temperature in the order of 100° C., to remove centrifugally separable impurities from the juice, and then returning the centrifuged juice from said locus to the evaporating apparatus and completing the evaporation therein.

HANS OLOF LINDGREN.

REFERENCES CITED

The following references are of record in the file of this patent:

UNITED STATES PATENTS

| Number | Name | Date |
|---|---|---|
| 256,835 | Hamlin | Apr. 25, 1882 |
| 462,095 | Hamelberg | Oct. 27, 1891 |
| 978,451 | Homans | Dec. 13, 1910 |
| 984,578 | Manoury | Feb. 21, 1911 |
| 1,117,195 | Kopke | Nov. 17, 1914 |
| 2,054,556 | Copp | Sept. 15, 1936 |

FOREIGN PATENTS

| Number | Country | Date |
|---|---|---|
| 287,526 | Great Britain | May 30, 1929 |
| 290,265 | Great Britain | May 21, 1929 |
| 707,503 | France | Apr. 14, 1931 |
| 76,906 | Sweden | Jan. 17, 1929 |